United States Patent
Barrett et al.

(10) Patent No.: US 7,249,658 B2
(45) Date of Patent: Jul. 31, 2007

(54) WIDE CALIPER ASSEMBLY DESIGN

(75) Inventors: Sean C Barrett, Farmington Hills, MI (US); Philip N Jedele, Ypsilanti, MI (US)

(73) Assignee: Akebono, Elizabethtown, KY (US)

( * ) Notice: Subject to any disclaimer, the term of this patent is extended or adjusted under 35 U.S.C. 154(b) by 0 days.

(21) Appl. No.: 10/973,054

(22) Filed: Oct. 25, 2004

(65) Prior Publication Data
US 2005/0236237 A1    Oct. 27, 2005

Related U.S. Application Data

(60) Provisional application No. 60/564,517, filed on Apr. 22, 2004.

(51) Int. Cl.
F16D 65/14 (2006.01)
(52) U.S. Cl. ............................. 188/73.45; 188/73.46; 188/73.47
(58) Field of Classification Search ............. 188/73.43, 188/73.44, 73.45, 73.46, 73.47
See application file for complete search history.

(56) References Cited

U.S. PATENT DOCUMENTS

| | | | |
|---|---|---|---|
| 5,158,159 A | 10/1992 | Thiel et al. | |
| 5,178,236 A | 1/1993 | Terashima | |
| 5,188,202 A | 2/1993 | Terashima | |
| 5,205,383 A | 4/1993 | Terashima | |
| 5,259,484 A | 11/1993 | Idesawa et al. | |
| 5,282,521 A | 2/1994 | Leist et al. | |
| 5,343,985 A | 9/1994 | Thiel et al. | |
| 5,363,944 A | 11/1994 | Thiel et al. | |
| 5,538,105 A | 7/1996 | Rike | |
| 5,931,267 A | 8/1999 | Iwata et al. | |
| 5,979,611 A | 11/1999 | Sasaki et al. | |
| 6,039,156 A * | 3/2000 | Schneider | 188/73.44 |
| 6,092,631 A | 7/2000 | Matsuzaki et al. | |
| 6,131,706 A * | 10/2000 | Gotti et al. | 188/72.4 |
| 6,173,819 B1 | 1/2001 | Meiss et al. | |
| 6,223,867 B1 | 5/2001 | Doi et al. | |
| 6,247,561 B1 * | 6/2001 | Doi et al. | 188/73.39 |
| 6,427,810 B2 | 8/2002 | Schorn et al. | |
| 6,446,766 B1 | 9/2002 | Cornolti et al. | |
| 6,478,121 B2 | 11/2002 | Reeves | |
| 6,533,079 B2 * | 3/2003 | Charmat | 188/73.31 |
| 6,609,594 B1 * | 8/2003 | Charmat et al. | 188/73.45 |
| 6,725,981 B1 * | 4/2004 | Franz | 188/73.45 |
| 6,782,977 B1 * | 8/2004 | Mackiewicz | 188/73.45 |
| 6,851,524 B2 * | 2/2005 | Takeda et al. | 188/73.39 |
| 2004/0188188 A1 * | 9/2004 | Barbosa et al. | 188/71.1 |
| 2004/0188191 A1 * | 9/2004 | Lintner | 188/73.45 |

FOREIGN PATENT DOCUMENTS

| | | |
|---|---|---|
| DE | 100 07 354 | 8/2001 |
| EP | 0 826 894 | 3/1998 |

* cited by examiner

*Primary Examiner*—Devon Kramer
(74) *Attorney, Agent, or Firm*—Dobrusin & Thennisch PC

(57) ABSTRACT

A disc brake caliper assembly is provided including a support bracket, a pair of slide pins, and a caliper body. The support bracket includes an inboard rail and an outboard rail. The inboard rail defines a pair of engagement bores. The pair of slide pins engage the pair of engagement bores. The caliper body slidably engages the pair of slide pins. The caliper body includes an inboard portion and an outboard portion. The inboard and outboard portions balance each other such that the caliper body has a center of gravity that is substantially axially aligned with the location of engagement between the slide pins and the engagement bores.

21 Claims, 7 Drawing Sheets

WIDE CALIPER ASSEMBLY DESIGN

CROSS-REFERENCE TO RELATED APPLICATIONS

This application claims the benefit of U.S. Provisional Application No. 60/564,517, filed on Apr. 22, 2004.

FIELD OF THE INVENTION

The present invention relates generally to a disc brake caliper assembly and, more particularly, to a disc brake caliper assembly designed to reduce radial packaging space.

BACKGROUND OF THE INVENTION

Disc brake systems include a disc, often referred to as a rotor, and a caliper assembly. The disc is typically fixed to a wheel of a vehicle. The caliper assembly is disposed on or near an edge of the disc. The caliper assembly includes a pair of brake pads. The brake pads are operable to engage the disc and apply a torque to the disc in a direction opposite to its rotation. The radial position at which the sum of frictional forces created at the pad-to-disc interface is called the effective radius. Increasing the effective radius increases the torque generated by the brake. The effective radius can be increased by providing a larger diameter disc and/or by positioning the pad centroid closer to the outer radial edge of the disc.

Most brake caliper assemblies can be categorized as either Frame calipers or Fist calipers. Fist calipers typically include a support bracket, a caliper body, and a pair of connecting pins. In one known device, the support bracket is fixed to a component of the vehicle such as an axle. The brake pads are positioned on opposite sides of the disc and are typically slidably disposed on the support bracket or the caliper body. The caliper body is slidably supported by the connecting pins on the support bracket. The caliper body may include a bridge that extends axially from an inboard surface of the disc to an outboard surface of the disc. Most bridges are slightly arc-shaped to receive the radial edge of the disc. Upon actuation of the brake system, the bridge typically translates axially inboard and causes the brake pads to frictionally engage opposite sides of the disc. This often places the bridge in bending, which is an inefficient use of mass. Connecting pins generally extend over the rotor between the inboard and outboard sides of the support bracket. Minimum casting is required around the perimeter of the connecting pins. Casting clearance is also required to the wheel and rotor. Thus the rotor size is limited by these parameters as well as the connecting pin diameter.

Frame calipers generally include a support bracket, a caliper body, and a pair of connecting pins. The caliper body generally has an inboard side, an outboard side, and a caliper bridge having two sides. The Frame caliper bridge is typically thinner than a Fist caliper bridge. This allows for a larger diameter rotor within a given wheel compared to a Fist caliper. Connecting pins are generally on the inboard side of the rotor for Frame calipers due to the reduced radial packaging that a larger diameter rotor provides, which does not allow for the connecting pins to extend over the rotor. The outboard side is generally thicker than a Fist caliper outboard side. Frame calipers require more outboard packaging space which is not suitable for front brake applications where other vehicle parameters dictate wheel and rotor position.

SUMMARY OF THE INVENTION

A disc brake caliper assembly is provided including a support bracket, a pair of slide pins, and a caliper body. The support bracket includes an inboard rail and an outboard rail. The inboard rail defines a pair of engagement bores. The pair of slide pins engage the pair of engagement bores. The caliper body slidably engages the pair of slide pins. The caliper body includes an inboard portion and an outboard portion. The inboard and outboard portions balance each other such that the caliper body has a center of gravity acting in a vertical plane that is substantially axially aligned with the pair of engagement bores of the inboard rail.

Another aspect of the present invention provides a disc brake caliper assembly including a support bracket, a pair of slide pins, and a caliper body. The pair of slide pins are attached to the support bracket. The caliper body slidably engages the pair of slide pins. The caliper body includes a continuous bridge. The circumferential end portions are adapted to be loaded in tension. The central portion is adapted to be loaded in bending.

Another aspect of the present invention provides a disc brake assembly including a disc, a support bracket, a pair of slide pins, and a caliper body. The disc includes a radial edge, an inboard face, and an outboard face. The inboard face is opposite the outboard face. The support bracket includes an inboard rail and an outboard rail. The inboard rail is disposed adjacent the inboard face of the disc. The outboard rail is disposed adjacent the outboard face of the disc. The pair of slide pins are attached to and extend axially inboard from the inboard rail at a location displaced radially inward from the radial edge of the disc. The caliper body slidably engages the pair of slide pins.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
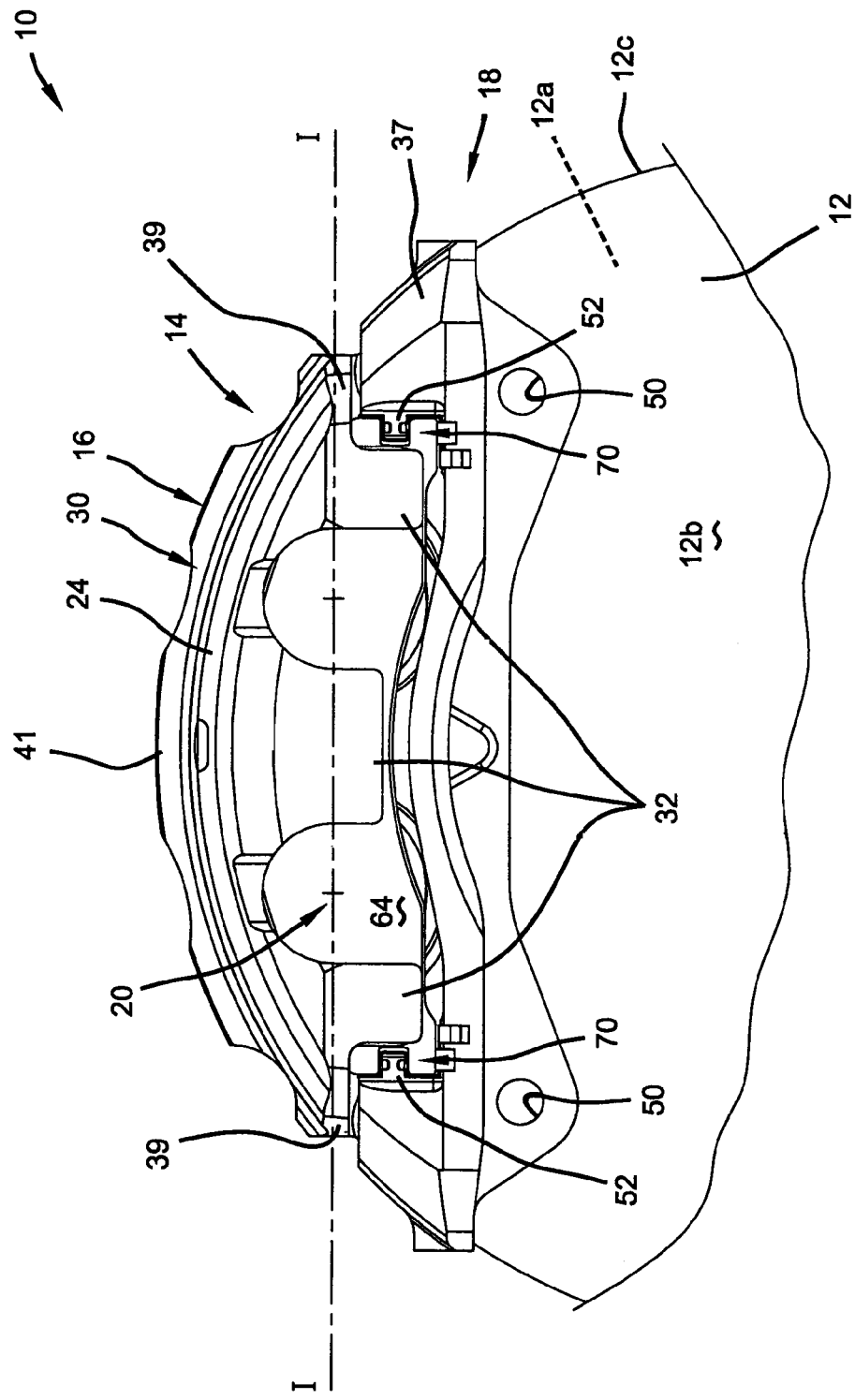
FIG. 1 is an outboard view of a disc brake assembly in accordance with the principles of the present invention.

The following description of the preferred embodiment is merely exemplary in nature and is in no way intended to limit the scope of the invention, its application, or its uses.

With reference to the Figures, a disc brake assembly 10 in accordance with the present invention generally includes a disc 12 and a caliper assembly 14. The disc 12 is a generally circular metal plate having an inboard face 12a, an outboard face 12b, and a radial edge 12c. It is envisioned that the disc 12 includes a plurality of vents disposed between the inboard and outboard faces 12a, 12b to dissipate heat. The disc 12 is adapted to be fixed to a wheel or axle component of a vehicle such that the wheel, axle, and disc 12 all share a common rotational axis. The caliper assembly 14 receives a portion of the radial edge 12c of the disc 12. The caliper assembly 14 includes brake pads 20, which will be discussed in more detail below, that are operable to frictionally engage the faces 12a, 12b of the disc 12. This frictional engagement provides torque to the disc 12 in a direction opposite to its rotation, thereby braking the disc and ultimately the vehicle.

The caliper assembly 14 includes a caliper body 16, a support assembly 18, and a pad assembly 20. The caliper body 16 includes an inboard portion 22 and an outboard portion 24. The inboard portion 22 includes a pair of cylinder bores 26a, 26b and a pair of slide pin bores 28a, 28b. The pair of cylinder bores 26a, 26b have central axes disposed in a common plane, referred to hereinafter as the cylinder plane and designated in FIGS. 1 and 2 by centerline I-I. The slide pin bores 28a, 28b also include central axes disposed in a common plane, referred to hereinafter as the slide pin plane and designated in FIG. 2 by centerline II-II. The slide pin plane II-II is substantially parallel to and disposed radially inward from the cylinder plane I-I. Furthermore, the slide pin bores 28a, 28b are located radially inward from the radial edge 12c of the disc 12. It should further be appreciated that in an alternative embodiment, more or less than a pair of cylinder bores 26 may be utilized. In such a configuration, the central axes of each of the cylinder bores 26 would not be disposed in a common plane. It is envisioned that a caliper assembly 14 having three or more cylinder bores 26 would include the cylinder bores 26 aligned on an arc that is concentric with the disc 12. Nevertheless, each of the central axes of the cylinder bores 26 would be disposed radially outward of the slide pin plane II-II.

Figure 2:
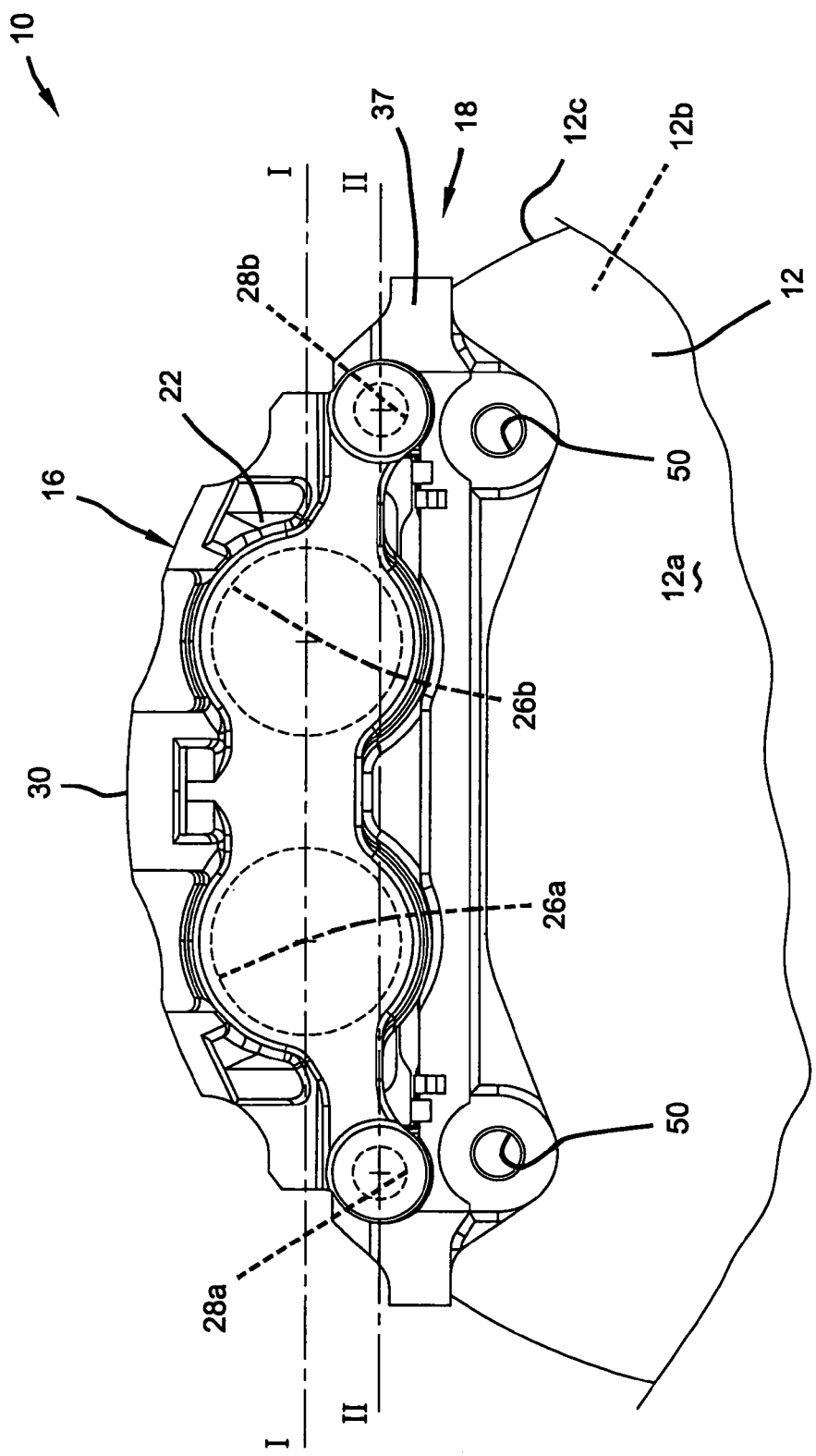
FIG. 2 is an inboard view of the disc brake assembly of FIG. 1.
Figure 3:
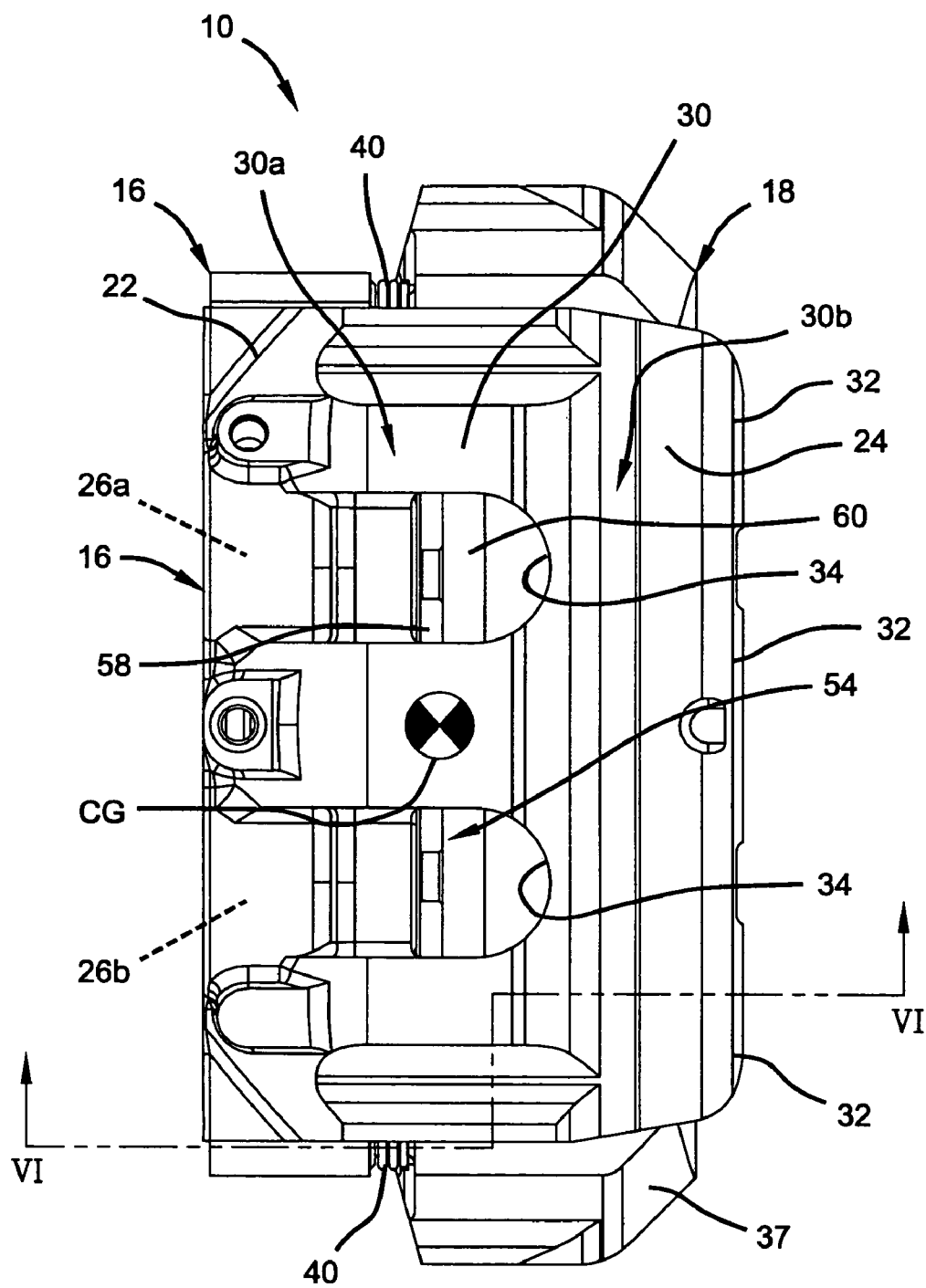
FIG. 3 is a top view of a caliper assembly of the disc brake assembly of FIG. 1.
Figure 4:
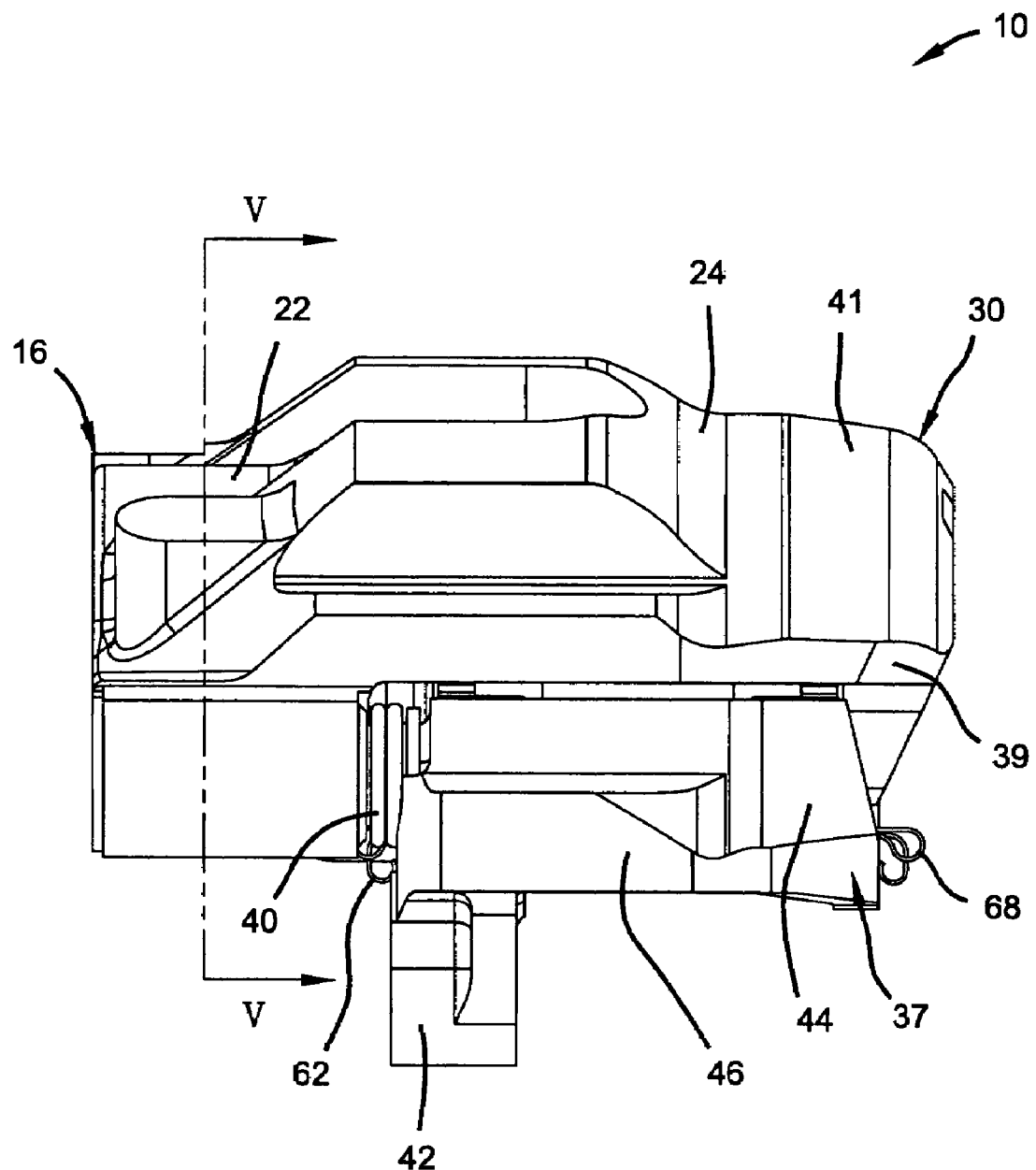
FIG. 4 is a side view of the caliper assembly of FIG. 1.
Figure 5:
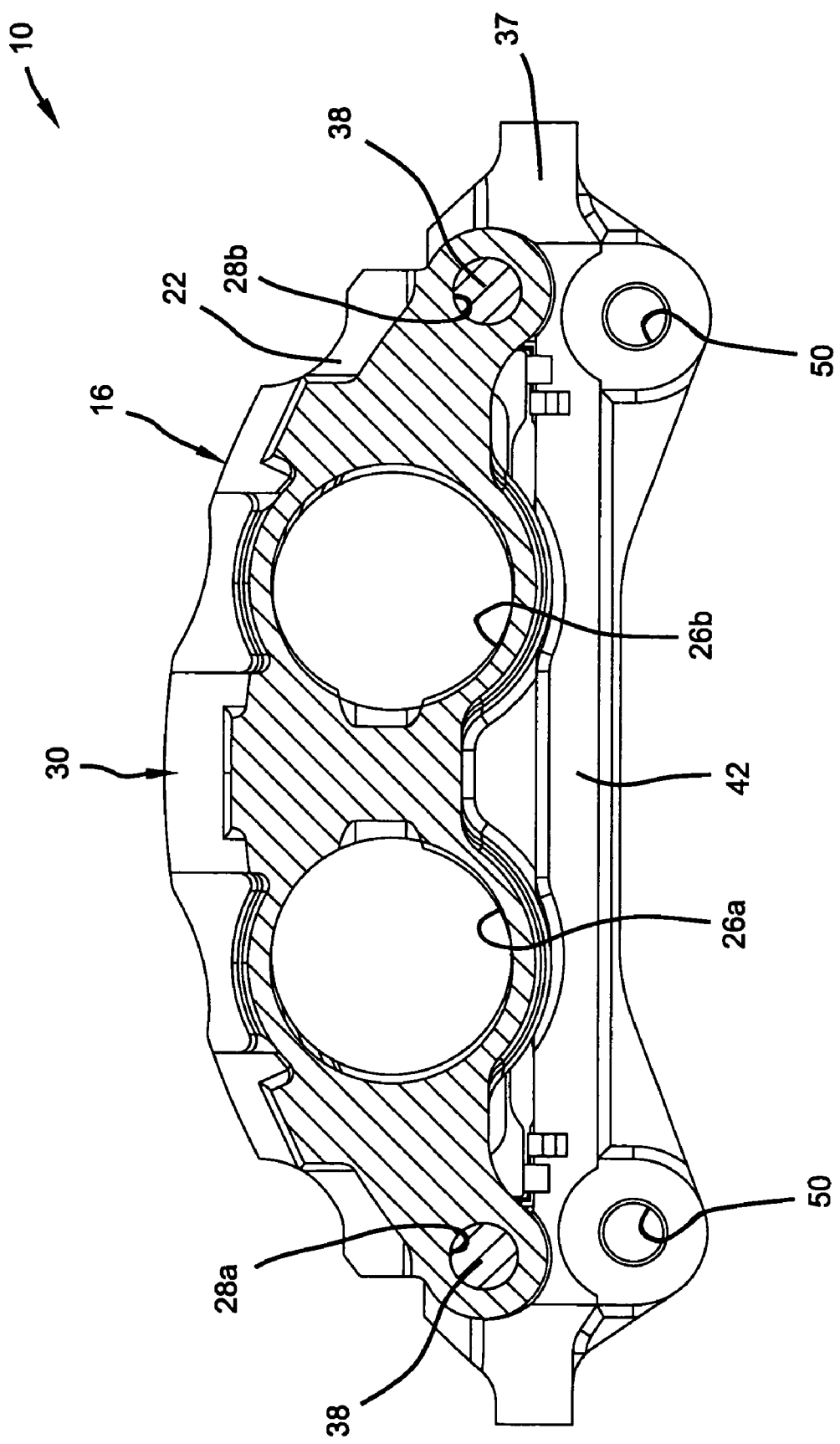
FIG. 5 is a cross-sectional outboard view of the caliper assembly of FIG. 1 taken through line V-V of FIG. 4.

The outboard portion 24 of the caliper body 16 includes a bridge 30 (best shown in FIG. 3) and a plurality of fingers 32 (best shown in FIG. 1). The bridge 30 is a semi-circumferential member having a substantially uniform radial thickness. In an exemplary embodiment, the distal end of the bridge 30 has a radial thickness $t_{r1}$ of less than or equal to 14 millimeters and a minimum axial dimension $t_{a1}$ of 20 millimeters. This helps reduce the weight and the radial packaging dimension of the caliper body 16. FIG. 3 depicts the arc-shaped bridge 30 including a proximal end 30a and a distal end 30b. The proximal end 30a is located adjacent the inboard portion 22 of the caliper body 16 and includes a pair of inspection windows 34. The distal end 30b is located between the proximal end 30a and the plurality of fingers 32.

FIG. 1 depicts the bridge 30 further including opposing circumferential end portions 39 and a central portion 41. The opposing circumferential end portions 39 are disposed below the cylinder plane I-I. The central portion 41 is disposed radially outward of the cylinder plane I-I.

Figure 6:
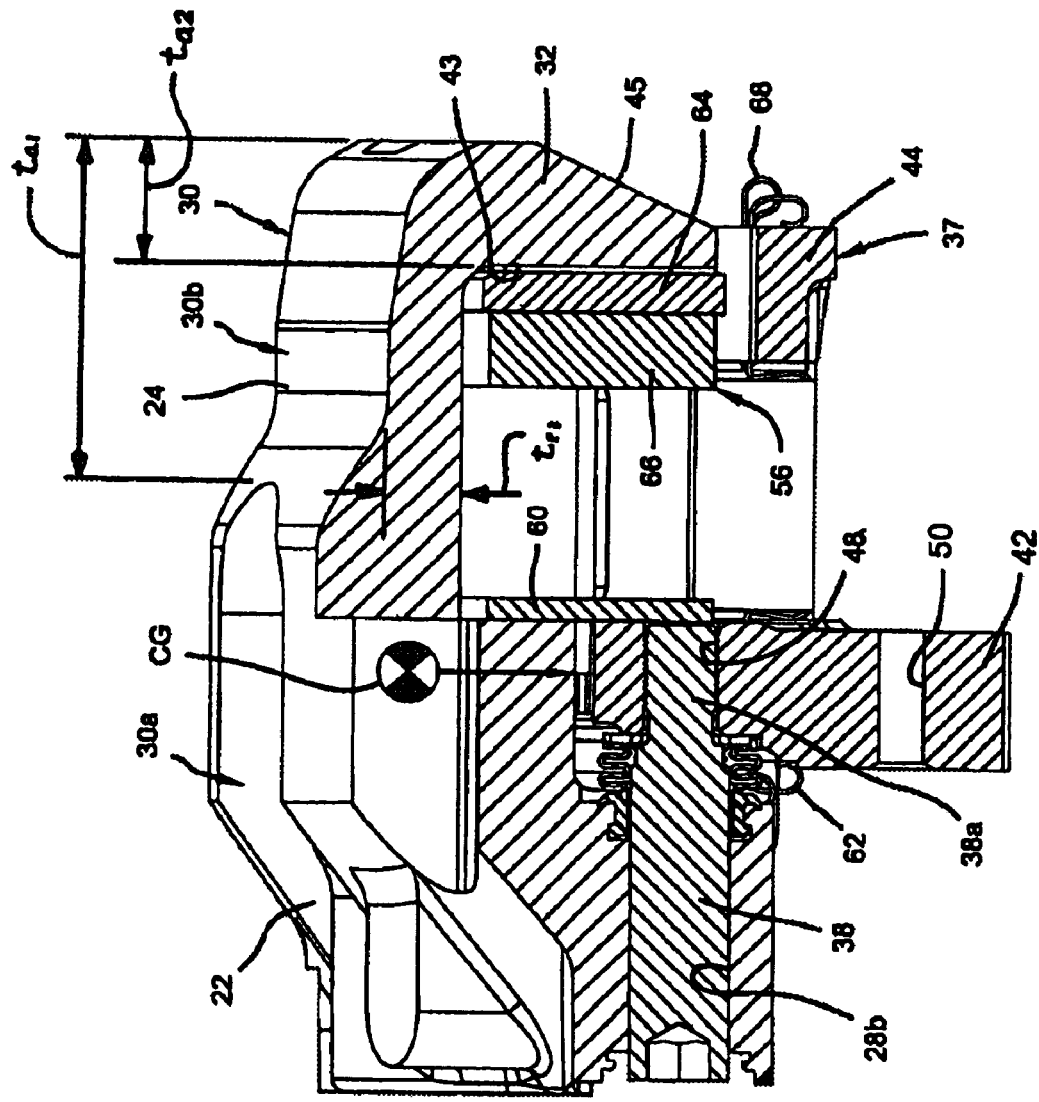
FIG. 6 is a cross-sectional front view of the caliper assembly of FIG. 1 taken through line VI-VI of FIG. 3.
Figure 7:
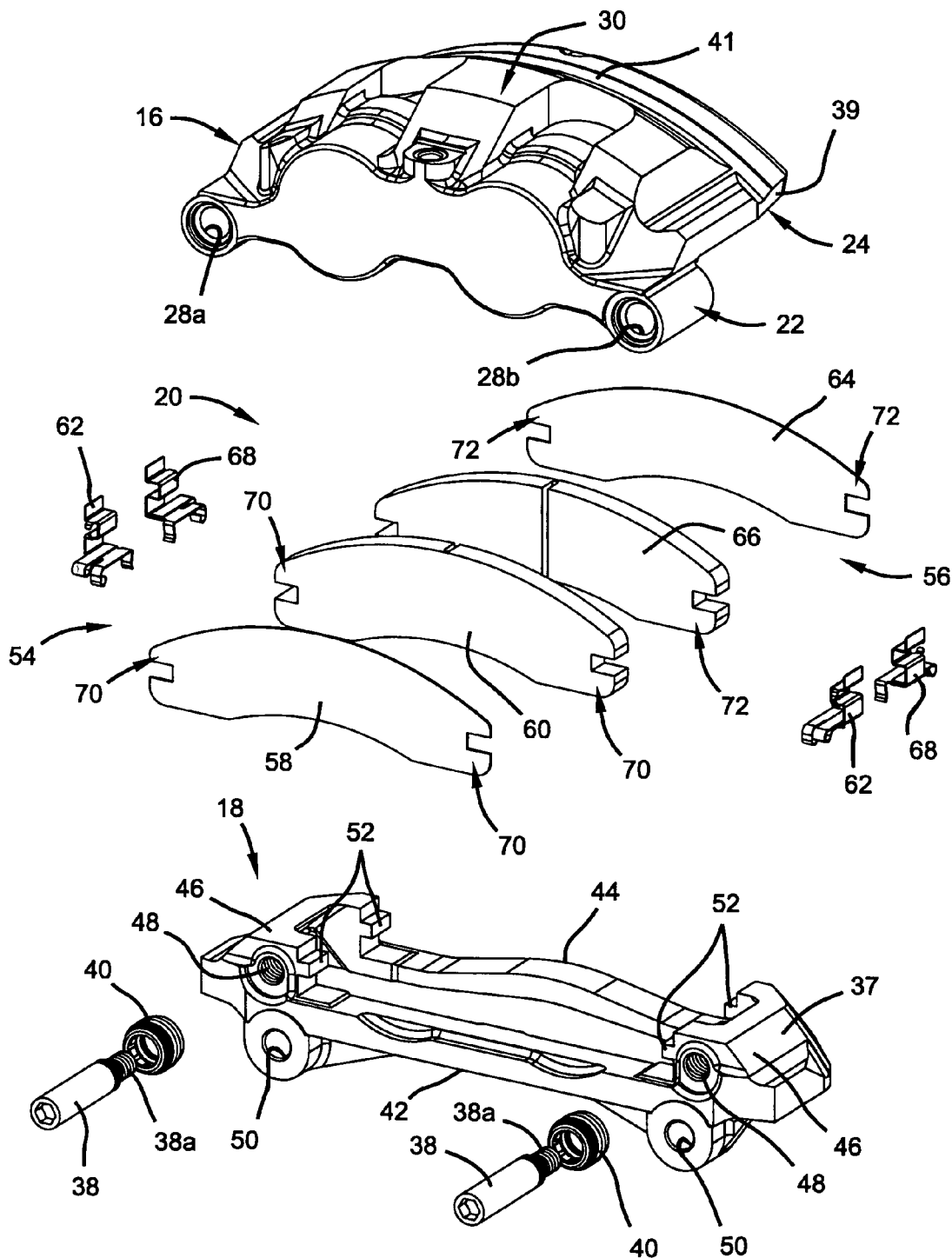
FIG. 7 is an exploded perspective view of the caliper assembly of FIG. 1.

With reference to FIGS. 1, 3 and 6, the plurality of fingers 32 include three fingers extending radially inward from the distal end 30b of the bridge 30. In an exemplary embodiment, the fingers have an axial dimension $t_{a2}$ of less than or equal to 30 millimeters. Each of the plurality of fingers 32 includes an inboard surface 43 and an outboard surface 45, as shown in FIG. 6. The combination of the fingers 32 and the distal end 30b of the bridge 30 help provide for a balance of weight between the inboard 22 and outboard 24 portions of the caliper body 16. This balance of weight results in the caliper body 16 having a center of gravity acting within a substantially vertical plane that is axially aligned with threaded portions 38a of a pair of slide pins 38, which will be discussed in more detail below. The center of gravity is represented by the axis symbols in FIGS. 3 and 6. This location of the center of gravity ensures proper operation of the caliper assembly 14 by reducing its potential for fracturing due to reverse bending moments imparted on the pin by caliper body vibrations. The inspection windows 34 provide for a direct line of sight to the inboard pad assembly 54, as shown in FIG. 3. This is useful to inspect whether an inboard brake pad 60, which will be discussed in more detail below, needs to be replaced. It should be appreciated that there also exists an outboard brake pad 66, as shown in FIG. 7. In an exemplary embodiment, the inboard and outboard brake pads 60, 66 will wear evenly such that inspection of the inboard brake pad 60 will also indicate whether the outboard brake pad 66 needs to be replaced.

FIG. 7 depicts support assembly 18 including a bracket 37, the pair of slide pins 38, and a pair of flexible boots 40. The bracket 37 generally includes an inboard rail 42, an outboard rail 44, and a pair of opposing end rails 46. The inboard rail 42 is a generally elongated member including a pair of threaded bores 48, a pair of fixture bores 50, and a pair of tongues 52. The outboard rail 44 is a generally elongated member including a pair of tongues 52. As stated above, the slide pins 38 each include the threaded portions 38a. The threaded portions 38a threadably engage the bores 48 in the inboard rail 42 of the bracket 37. Therefore, the slide pins 38 cantilever axially inward from the inboard rail 42. The slide pins 38 slidingly engage the slide pin bores 28a, 28b of the caliper body 16 to support the caliper body 16 relative to the support bracket 37. The flexible boots 40 are generally convoluted and constructed of rubber or another flexible material. The flexible boots 40 are disposed on the slide pins 38 between inboard rail 42 of the bracket 37 and the caliper body 16. The flexible boots 40 prevent dust and/or debris from collecting on the slide pins 38 or in the slide pin bores 28a, 28b during operation of the brake assembly 10, as will be described in more detail below.

FIG. 7 further depicts the pad assembly 20 generally including an inboard assembly 54 and an outboard assembly 56. The inboard assembly 54 includes an inboard lining plate 58, an inboard brake pad 60, and a pair of inboard retaining clips 62. The outboard assembly 56 includes an outboard lining plate 64, an outboard brake pad 66, and an outboard pair of retaining clips 68. It should be appreciated that the inboard 54 and outboard 56 assemblies are identical mirror components of each other. In an exemplary embodiment, the inboard assembly 54 and outboard assembly 56 each have a centroid (not shown) located within three millimeters of the cylinder plane I-I.

The inboard brake pad 60 and lining plate 58 each include a pair of inboard forks 70. The forks 70 slidably receive the tongues 52 on the inboard rail 42 of the bracket 37. This enables the inboard lining plate 58 and brake pad 60 to axially displace relative to the bracket 37. The inboard retaining clips 62 retain the lining plate 58 and brake pad 60 on the tongues 52 of the inboard rail 42. The outboard brake pad 66 and lining plate 64 each include a pair of outboard forks 72 similar to the inboard forks 70 on the inboard brake pad 60. The outboard forks 72 slidably receive the tongues 52 on the outboard rail 44 of the bracket 37. The outboard retaining clips 68 retain the outboard lining plate 64 and outboard brake pad 66 on the tongues 52 of the outboard rail 44.

During operation, an external hydraulic source (not shown) displaces a pair of pistons (not shown) disposed within the cylinders 26*a*, 26*b*. End portions of the pistons engage the inboard lining plate 58. The inboard lining plate 58 and inboard brake pad 60 axially displace on the tongues 52 toward the inboard face 12*a* of the disc 12. The inboard brake pad 60 frictionally engages the inboard face 12*a* of the disc 12 to apply a torque thereto. This forces the caliper body 16 to slide on the slide pins 38 and displace inboard. The inboard surface 43 of the fingers 32 on the caliper body 16 engage the outboard lining plate 64. The outboard lining plate 64 and outboard brake pad 66 axially displace on the tongues 52 toward the outboard face 12*b* of the disc 12. The outboard brake pad 66 frictionally engages the outboard face 12*b* of the disc 12 to apply a torque thereto substantially equivalent to the torque applied by the inboard brake pad 60. The combined engagement of the brake pads 60, 66 with opposite faces of the disc 12 places a load on the bridge 30 of the caliper body 16. The central portion 41 of the bridge 30 is loaded in bending. The opposing circumferential end portions 39 are loaded in tension. A continued application of force, via the pistons (not shown), increases the frictional engagement between the brake pads 60, 66 and the disc 12 to slow the rotation of the disc 12 and ultimately the vehicle to which it is attached.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A disc brake caliper assembly, comprising:
    a support bracket including an inboard rail and an outboard rail, said inboard rail defining a pair of engagement bores;
    a pair of slide pins engaging said pair of engagement bores to attach said pair of slide pins to said bracket; and
    a caliper body slidably engaging said pair of slide pins, said caliper body including an inboard portion and an outboard portion, wherein said inboard and outboard portions balance each other such that said caliper body has a center of gravity that is substantially axially aligned with a location of engagement between said slide pins and said engagement bores.

2. The caliper assembly of claim 1 wherein said pair of engagement bores are threaded.

3. The caliper assembly of claim 1 wherein said slide pins cantilever axially inboard of said inboard rail.

4. The caliper assembly of claim 1 wherein said inboard portion of said caliper body includes a cylinder bore having a central axis disposed in a first plane.

5. The caliper assembly of claim 4 wherein said slide pins have central axes disposed in a second plane that is substantially parallel to and displaced radially inward from said first plane.

6. The caliper assembly of claim 4 where circumferential end portions of a caliper bridge are radially inward of said first plane.

7. The caliper assembly of claim 4 wherein end rails of the support bracket are radially inward of circumferential end portions of a caliper bridge.

8. The caliper assembly of claim 1 wherein said outboard portion of said caliper body includes a bridge having a proximal end adjacent said inboard portion and a distal end adjacent a plurality of fingers.

9. The caliper assembly of claim 8 wherein said proximal end includes an inspection aperture.

10. The caliper assembly of claim 8 wherein said distal end of said bridge includes a maximum radial dimension of 14 millimeters and a minimum axial dimension of 20 millimeters.

11. The caliper assembly of claim 8 wherein said plurality of fingers includes three fingers having a maximum axial dimension of 30 millimeters.

12. A disc brake caliper assembly, comprising:
    a support bracket including an inboard rail and an outboard rail, said inboard rail defining a pair of threaded engagement bores;
    a pair of slide pins each including a threaded portion and a smooth portion, said threaded portion configured to engage said threaded engagement bores to attach said slide pins to said bracket, and said smooth portion having a continuous surface extending to an end portion of the slide pins; and
    a caliper body slidably engaging with said smooth portion of said pair of slide pins, said caliper body including an inboard portion and an outboard portion, wherein said inboard and outboard portions balance each other such that said caliper body has a center of gravity that is substantially axially aligned with the threaded engagement of the slide pins and engagement bores.

13. The disc brake assembly of claim 12, wherein the inboard rail and the outboard rail each include a pair of retaining clips for engagement with a pair of brake pads.

14. The disc brake assembly of claim 13, wherein the pair of retaining clips of the inboard rail and the outboard rail are separated by a rotor gap formed by the support bracket.

15. The disc brake assembly of claim 12, wherein the pair of slide pins have a substantially continuous outer diameter that extends from the end portion and over a majority length of the slide pins.

16. The disc brake assembly of claim 15, wherein the slide pins have an outer diameter substantially the same as the inner diameter of the slide pin bores formed in the caliper body.

17. The disc brake assembly of claim 12, wherein the slide pins have an outer diameter substantially the same as the inner diameter of the slide pin bores formed in the caliper body.

18. The disc brake assembly of claim 12, Further comprising a seal disposed on the slide pin for preventing dust, debris or both from collecting on the slide pins.

19. The disc brake assembly of claim 18, wherein the seal comprises a flexible boot located between the support bracket and caliper body.

20. The disc brake assembly of claim 16, further comprising a seal disposed on the slide pin for preventing dust, debris or both from collecting on the slide pins.

21. The disc brake assembly of claim 20, wherein the seal comprises a flexible boot located between the support bracket and caliper body.

\* \* \* \* \*

UNITED STATES PATENT AND TRADEMARK OFFICE
CERTIFICATE OF CORRECTION

PATENT NO. : 7,249,658 B2  
APPLICATION NO. : 10/973054  
DATED : July 31, 2007  
INVENTOR(S) : Sean C. Barrett et al.

It is certified that error appears in the above-identified patent and that said Letters Patent is hereby corrected as shown below:

On title page, item 73 Assignee,  
replace "Akebono, Elizabethtown, KY (US)"  
with --Akebono Corporation (North America), Elizabethtown, KY (US).--

Signed and Sealed this

Sixth Day of November, 2007

JON W. DUDAS  
*Director of the United States Patent and Trademark Office*